United States Patent
Lehmbeck

[15] 3,697,184
[45] Oct. 10, 1972

[54] APPARATUS FOR EVALUATING THE RECORDING CHARACTERISTICS OF A THERMOPLASTIC PHOTORECEPTOR

[72] Inventor: Donald R. Lehmbeck, Penfield, N.Y.
[73] Assignee: Xerox Corporation, Stamford, Conn.
[22] Filed: April 1, 1971
[21] Appl. No.: 130,346

[52] U.S. Cl..................................................356/175
[51] Int. Cl..................................................G01j 3/46
[58] Field of Search........................356/175, 201–203

[56] References Cited

UNITED STATES PATENTS 3,620,727  11/1971  Smajo........................356/175

OTHER PUBLICATIONS

Lamberts, R. L. et al., " Equipment for Routine Evaluation of the Modulation Transfer Function of Photographic Emulsions, 11, The Microdensitometer," Photographic Science and Engineering, Vol. 9. No. 5, Sept.– Oct. 1965, pp. 335– 339.

Primary Examiner—Ronald L. Wibert
Assistant Examiner—Orville B. Chew, II
Attorney—James J. Ralabate, Donald F. Daley and Thomas J. Wall

[57] ABSTRACT

A target for evaluating the characteristics of a thermoplastic photosensitive element is herein disclosed. The target includes a partially transparent or partially absorbing film having at least two fixed narrow bandwidth slits therein and a mask of varying optical density placed on top of or underneath the slit containing film. The target is capable of being positioned in contact with the photosensitive element to reside between the element and a source of exposing radiation. When exposed to a calibrated source of light, an image of known high frequency spatial intensity distribution surrounded by a normal sensitometric exposure results. By observing the effects of this known exposure on a developed thermoplastic photoreceptor characteristics of major concern can be determined.

8 Claims, 6 Drawing Figures

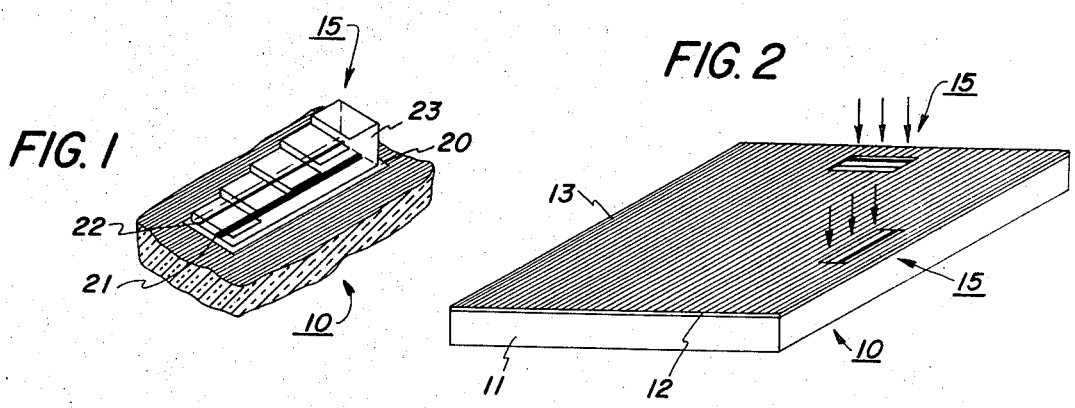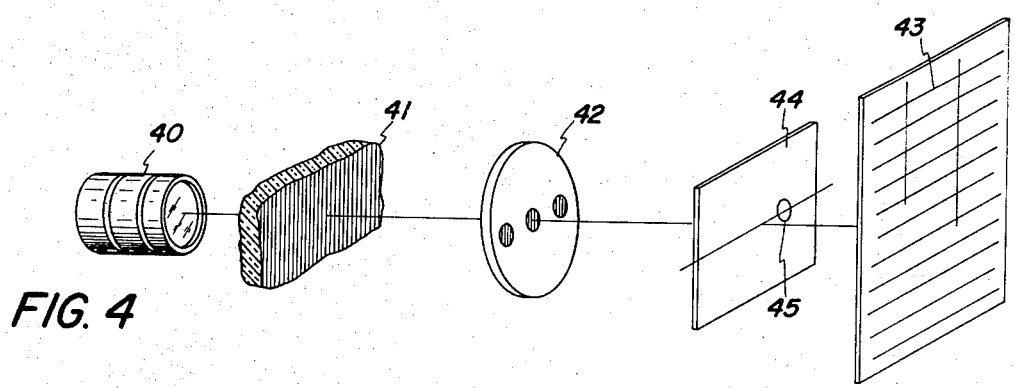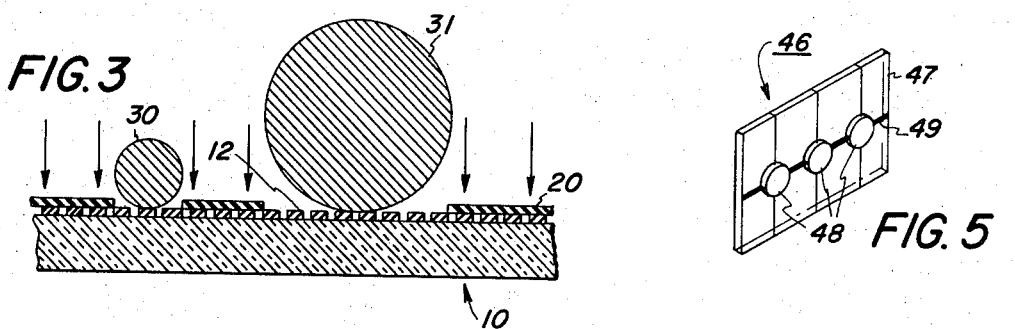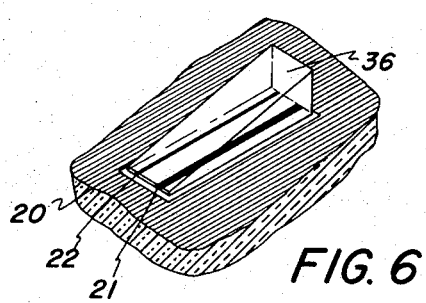
INVENTOR
DONALD R. LEHMBECK
BY
ATTORNEY

APPARATUS FOR EVALUATING THE RECORDING CHARACTERISTICS OF A THERMOPLASTIC PHOTORECEPTOR

This invention relates to a target suitable for use in evaluating the imaging characteristics of photographic material and, in particular, the characteristics of a thermoplastic xerographic plate.

As originally disclosed by Gundlach and Claus in the January–February 1963 issue of Photographic Science and Engineering, beginning at page 14, thermoplastic xerography, as the name implies, involves the recording electrostatically of image information upon a deformable thermoplastic receptor using conventional xerographic techniques. By applying either heat or a suitable solvent to the thermoplastic receptor material, the surface of the receptor is caused to wrinkle or "frost" in a selective manner to record thereon a light scattering image of the original. The recorded image can be either viewed directly or recovered by means of modified Schlieren optics or the like.

The recording of continuous tone images in the basic frost system has proven to be difficult because of the systems inherently poor DC response. Urbach, in the September–October 1966 issue of Photographic Science and Engineering (page 287) describes a technique by which the response of the frost system is considerably improved by optically screening the input scene information. Particularly dramatic results have been obtained by employing optical gratings having frequencies near the quasiresonant frequency range of the thermoplastic photoreceptor material.

A thermoplastic xerographic plate can be recycled. That is, the image information recorded thereon can be erased and the plate easily restored to a condition to receive a new image. Because of the plates ability to be recycled, the thermoplastic xerographic process provides many functional and economical advantages over most conventional image recording systems. However, in some cases, prolonged usage may result in slight changes occurring in the plates imaging characteristics. If these changes can be detected and identified in some manner, the system can be readily restored to optimum operation conditions by adjusting one or more of the input variables to compensate for the change. Apparatus, that is an integral part of the plate, suitable for readily determining the imaging characteristics of a thermoplastic xerographic plate have, however, heretofore been unavailable in the art.

It is therefore an object of the present invention to provide apparatus by which the characteristics of a thermoplastic xerographic plate are monitored.

A further object of this invention is to provide a built-in fixed bandwidth target for use in screened thermoplastic xerography for measuring and evaluating the systems relevant imaging characteristics.

A still further object of the present invention is to monitor and evaluate the response of a thermoplastic plate to images within a preselected spatial frequency band and of preselected modulations and spectral distributions.

Yet another object of this invention is to rapidly and efficiently determine the imaging properties of a thermoplastic xerographic plate.

These and other objects of the present invention are attained by means of a fixed bandwidth target positionable between a known source of illumination and the light sensitive elements of a thermoplastic xerographic plate and in contact or near contact with said light sensitive elements. The target is composed of a light transmitting support, a partially transmitting or partially absorbing coating over the support, a plurality of substantially parallel light transmitting slits in the coating with each slit width adjusted to produce a discrete but different bandwidth and a mask of progressively increasing optical density overlying or underlying the parallel slits with the optical density of the mask increasing along the length of the slits. Developing the plate after it has been exposed to a known source of illumination through the fixed bandwidth target produces a series of intensity scale sensitometric exposures and image spreading test exposures from which meaningful response variables can be determined.

For a better understanding of the invention as well as other objects and further features thereof, reference is had to the following detailed description of the invention to be read in connection with the accompanying drawings, wherein:

FIG. 1 is a perspective view in partial section showing a step tablet fixed bandwidth target embodying the teachings of the present invention;

FIG. 2 is a perspective view of an optical grating for modulating the input signal to a thermoplastic plate showing the positioning of targets in the margin thereof;

FIG. 3 illustrates a means for producing targets of a known bandwidth on the surface of the optical grating illustrated in FIG. 2;

FIG. 4 illustrates an image recovery system for reading out target image information recorded on a screened thermoplastic xerographic plate;

FIG. 5 shows a mask positionable in the back focal plane of the read-out system shown in FIG. 4 for modulating the spectra of the grating screen frequency; and FIG. 6 is another embodiment of the present invention wherein a wedge of varying optical density is substituted for the step tablet shown in FIG. 1.

The present invention will be described in reference to the screened thermoplastic, xerographic process (STX) as disclosed in U.S. Pat. No. 3,436,216. However, it should be clear to one skilled in the art that the teachings embodied herein are not necessarily limited to this particular environment and the present invention can be used in a wide range of applications.

Basically, because of its novel features, the apparatus of the present invention is capable of supplying information by which the recording characteristics of a STX plate can be evaluated. The properties of major concern in the STX system are sensitometric response, noise and image spreading.

Conventionally, in the STX process, the surface of a photosensitive plate, composed of thermoplastic material, is uniformly charged and a photoconductive layer beneath the charged surface then exposed from the opposite side to a light image containing original input scene information and the input information recorded in the form of a latent electrostatic image. Prior to exposing the plate, however, the image information is first caused to pass through an optical screen similar to that illustrated in FIG. 2. Passing the image through the optical screen or grating produces a phase image on the receptor that is composed of a periodic carrier wave and a modulated signal containing the original input scene information. Because of the development process, thermoplastic deformations follow the latent electrostatic image to produce a phase image.

The optical screen 10 illustrated in FIG. 2, consists of a light transparent base 11 having ridges of opaque material 12 thereon so that an optical screen is formed in the opaque coating which is made up of a fine array of parallel light transmitting slits 13 which are separated by the ridges of the opaque material. The repetition frequency of the screen is such that the projected image produces an electrostatic pattern on the image receptor having a frequency within the hydrodynamic resonant frequency of the thermoplastic material. Positioned along the margins of the grating, preferably outside of the field of the original input scene, are a plurality of fixed bandwidth targets 15 embodying the teachings of the present invention.

Referring more specifically to FIG. 1, each target includes a partially transparent or partially absorbing film 20 that is placed directly over the optical screen. Two substantially parallel clear slits 21, 22 are accurately fabricated in the opaque film. The width of each slit is uniform along the length thereof so that the slit is capable of acting as a single line bar chart or rectangular pulse target. Over the film is placed a mask of varying optical density. In this particular embodiment a step tablet 23 is utilized having the steps arranged so that the optical density of the mask increases along the length of the slits.

Of special interest in the thermoplastic xerographic process is the sensitivity response of the system, particularly in frequency ranges above 100 c/mn. Consequently, one of the slits, slit 21, which is the narrower of the two, is tuned to a fixed bandwidth of about 125 c/mn. The broader slit 22 is similarly formed in the opaque film parallel to the first slit 21. The second slit is tuned to a frequency of about 40 c/mn and serves as a means for evaluating the STX plates mid-range frequency response and provides a backup for the 125 c/mn target.

To prepare a target or targets on the optical screen grating, the working surface 12 of the grating is masked except for a small rectangular region or regions in the margin thereof. Two wires of different uniform diameters are then drawn taut adjacent to the screen over the unmasked region in the manner illustrated in FIG. 3. Using conventional vacuum deposition techniques, a relatively thin film of metal is deposited upon the screen in the unmasked region. During the deposition process, the wires serve to shield the screen from the evaporated metal. Upon completion of the deposition process the wires are removed leaving behind two parallel clear aperture slits in the deposited film. The precise distribution of transmittances in these slits can be measured using well known microdensitometery techniques.

In practice, a very thin film of metal is deposited in the masked region sufficient to produce a transmittance thereon of about 0.7 or more. A wire 30 (FIG. 3), about 8 microns in diameter, is used to produce a slit having a band-width of about 125 c/mn. Similarly, a wire 31, about 25 microns in diameter, is used to produce the 40 c/mn slits. It is preferred that both slits have a 1.4 to 10. transmittance ratio, which is equivalent to approximately 0.18 percent modulation, for a film transmittance of about 0.7 and a slit transmittance of 1.0.

A step tablet 23 is finally evaporated over the film by evaporating several different layers of the same material over the masked region. Preferably the steps cover a range of optical densities from 0.0 to 2.0 with the density of each increasing in a range between 0.07 and 0.3, with 0.10 being a preferred nominal value. It should be noted that the steps are arranged in the tablet so that the progression of densities is along the length of the two parallel slits.

Although the preferred embodiment of the present invention is described in relation to a step tablet, the invention is not necessarily so limited. As illustrated in FIG. 6, a continuous wedge 36 of monotonically increasing density may be evaporated over the film in a manner similar to that described above without departing from the teachings of the present invention.

When the slits are exposed to a calibrated light source through the step tablet or wedge, a latent image of predetermined intensity is caused to be recorded on the thermoplastic plate. This is then developed in the conventional manner causing the thermoplastic to deform producing a phase image. A read-out of the image information is obtained by several methods. One such method involves demodulating the target image information in accordance with the teachings of Suzuki et al. as disclosed in the July, 1964 issue of Applied Optics, beginning at page 825. A Suzuki read-out system suitable for recovering the target image information is illustrated in FIG. 4. This read-out system includes a source of illumination 40 arranged to pass highly collimated coherent light through the target imaged region of the STX plate 41. The light passing through the plate is diffracted in accordance with the recorded screen frequency and is then passed through a lens 42 which focuses the image information on a read-out screen 43. A Suzuki-type demodulation filter 44 is shown positioned in the back focal plane of the lens. The filter consists of an opaque mask having one clear aperture therein centered about one of the two first diffracted spectra associated with the screen frequency, the aperture being of a size small enough to block all other screen spectra but large enough to pass the modulating side bands.

The resulting image obtained either by Suzuki demodulation or any other suitable read-out device gives a visual presentation on screen 43 of the images of the fixed bandwidth lines that are recorded on the thermoplastic receptor. The lines provide an immediate presentation of the exposure required to produce a just visually detectable image of the known contrast and known bandwidth lines. Comparison of microdensitometric or microradiometric measurements of the image information to measurements made of the actual evaporated slits can be employed to directly determine modulation transfer functions as well as other important imaging characteristics of the thermoplastic plate. For example, a scan of the original profile can be made and a determination of the amplitude spectrum of the target gives the desired input image information. Scanning the output, i.e., the developed target image on the photoreceptor element, and correcting the readings obtained for the step tablet provides the effective exposure amplitude spectrum of the output signal. With this information, anyone skilled in the art can readily and efficiently obtain the modulation transfer function. Similarly, by noting the exposure time to produce the least detectable target image provides sufficient information for determining plate sensitivity and developability using well known image evaluating techniques.

Similarly, by blocking the spectra of the screen frequency and the line image and measuring the resultant scattered light intensity displayed on the screen for a particular region of the test area will provide a quantitative noise measurement. To obtain this type of demodulated signal in the Suzuki apparatus shown in FIG. 4, the single aperture filter 44 is removed from the back focal plane of the lens and a new filter 46 is substituted therefore. As illustrated in FIG. 5, filter 46 consists of a simple frame having suspended therein, upon relatively thin wires, three opaque dots 48 and a narrow thin mask 49. It should be clear that the position of the slits 49 are as shown when the screens are parallel to the target lines and are turned 90° when the screen is perpendicular to the target lines. Alternately, the dots alone can be used if the illuminated area of the test pattern is restricted to a region without either slit. When the mask 46 is positioned in the back focal plane of the read-out system, the three opaque dots coincide with the zero and two first diffracted order focal spots and serve to block this information from passing to the read-out plane while the thin mask 49 coincides with the diffracted spectra of the dots. The only signals reaching the read-out screen are therefore composed of scattered light or random noise information. Again, evaluating this information employing well known image evaluation technology readily provides a determination of the property of interest.

In the screened thermoplastic xerographic system as herein disclosed, it is preferred that at least two of these built-in targets be utilized, one target having its slits parallel to the screen lines while the other having its slits perpendicular thereto. More targets, however, may be employed to obtain additional information, particularly where information relating the uniformity of the development over the entire grating surface is desired.

It should be noted that nothing more than a simple light source is required to make an exposure of the built-in fixed bandwidth targets. When exposed to a calibrated uniform light source, an image of two slits of known discrete intensity, surrounded by a normal sensitometric exposure, results. By the same token, no special training is required to make the exposures for routine testing applications. Basic information is obtained by simply observing where the two target lines vanish. The test is relatively unambiguous and is capable of telling what exposure is required to see a very low contrast object, although a little more complex noise measurements can be readily obtained. Similarly, microphotometric traces of the very fine line image are capable of yielding all the information needed to obtain the modulation transfer function.

While this invention has been described with reference to the structure disclosed herein it is not necessarily confined to the details as set forth, and this application is intended to cover any modifications or changes that may come within the scope of the following claims.

What is claimed is:

1. Apparatus for evaluating the recording characteristics of a thermoplastic photoreceptor comprising:
   a grating being arranged to optically screen the original input scene information recorded on the thermoplastic receptor,
   a plurality of targets positioned adjacent said grating, each target further including
   a film being capable of partially transmitting light incident thereon and having at least two clear parallel aligned slits therein, each slit being adjusted to a separate and distinct spatial frequency bandwidth, and
   a mask of varying optical densities positioned adjacent said film with the optical density of the mask increasing along the length of said slits whereby images of a predetermined bandwidth and intensity are recorded on the thermoplastic receptor when the targets are illuminated by a source of illumination.

2. The apparatus of claim 1 wherein the transmittance of the film is about 0.7 and the transmittance of said slits is about 1.0.

3. The apparatus of claim 1 wherein one of said slits is tuned to the high frequency response range of the thermoplastic photoreceptor and another of said slits is tuned to the mid-frequency response range of the thermoplastic photoreceptor.

4. The apparatus of claim 3 wherein said one slit is adjusted to a bandwidth of about 125 c/mn and said another slit is adjusted to about 40 c/mn.

5. The apparatus of claim 1 wherein said mask comprises a step tablet covering a range of optical densities from about 0.0 to 2.0.

6. The apparatus of claim 5 wherein each step increases incrementally in density about 0.10.

7. The apparatus of claim 1 wherein at least one of said targets is located in the margin of said grating with the clear slits extending substantially parallel to the screen lines thereon.

8. The apparatus of claim 1 wherein at least one of said targets is positioned in the margin of said grating with the clear slits substantially perpendicular to the screen lines thereon.

* * * * *